(No Model.)

G. S. BLACK.
SAW GUIDE.

No. 315,229. Patented Apr. 7, 1885.

Attest:
H. H. Schott
A. R. Brown

Inventor:
George S. Black

UNITED STATES PATENT OFFICE.

GEORGE S. BLACK, OF INDIANAPOLIS, INDIANA, ASSIGNOR TO E. C. ATKINS & CO., OF SAME PLACE.

SAW-GUIDE.

SPECIFICATION forming part of Letters Patent No. 315,229, dated April 7, 1885.

Application filed January 26, 1885. (No model.)

*To all whom it may concern:*

Be it known that I, GEORGE S. BLACK, a citizen of the United States, residing at Indianapolis, in the county of Marion and State of Indiana, have invented certain new and useful Improvements in Saw-Guides; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improved saw-guide; and it consists in the construction, arrangement, and combination of parts, as hereinafter set forth.

Figure 1:
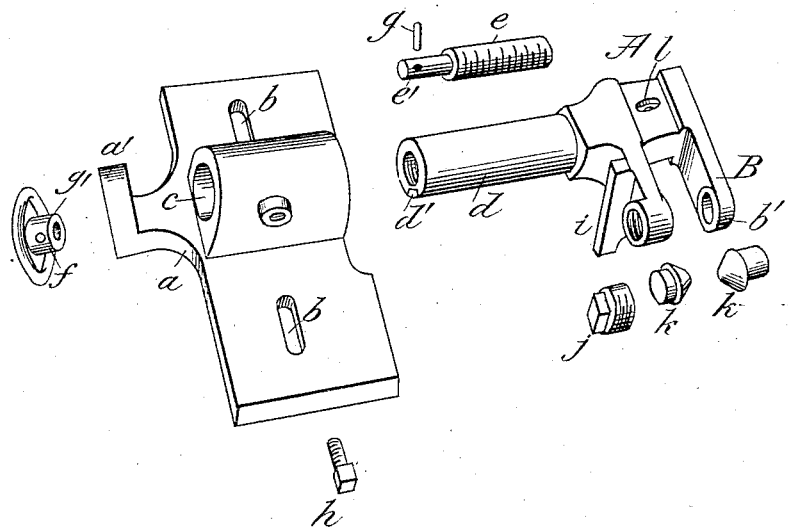
Figure 2:
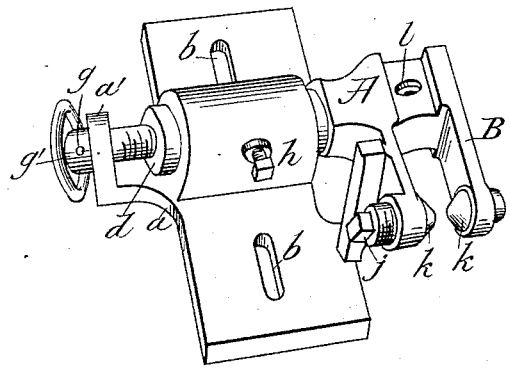

In the annexed drawings, illustrating my invention, Figure 1 is a perspective view of the various parts of the saw-guide detached; and Fig. 2 is a similar view of the saw-guide, representing the parts assembled and arranged in position for use.

Like letters designate like parts.

$a$ is a base-plate, having slots $b\ b$ for the passage of fastening devices, by which the saw-guide may be secured to a suitable support. This base-plate has a sleeve, $c$, cast thereon, for supporting the shank $d$ of the saw-guide, said shank being hollow and provided with internal screw-threads for the engagement of a threaded spindle, $e$, that is journaled in a lug, $a'$, at the back of the base-plate.

$f$ is a hand-wheel that is detachably secured to the rear end of the threaded spindle $e$ by means of a pin or bolt, $g$, passed through an enlarged hub or collar, $g'$, on one side of said wheel. This hub or collar $g'$ fits on the smooth reduced end $e'$ of the spindle $e$, and in connection with the enlarged end of said spindle, which fits against the front side of the lug $a'$, serves to prevent end movement of the spindle in adjusting the guide.

On each side of the shank $d$ is a longitudinal groove, $d'$, for engagement with a set-screw, $h$, that is passed through an aperture in one side of the sleeve $c$. By withdrawing the screw $h$ the saw-guide can be rotated to the right or left, as desired, according to the position of the saw, and the guide may then be secured by bringing the screw $h$ into engagement with one of the guide-grooves $d'$.

It will be seen that when the parts are in position, as shown in Fig. 2, the shank $d$ and attached saw-guide may be adjusted forward or back by turning the hand-wheel $f$ to the right or left, the threaded spindle $e$ being caused to rotate, while the shaft $d$, owing to the engagement of the screw $h$ and guide-groove $d'$, moves forward or back without rotating until the required adjustment is obtained. The forward end of the shank $d$ carries the body of the saw-guide A, which is provided on one side with parallel arms B B, that embrace the edge of the saw. The inner arm, B, is provided with a lug, $i$, that rests on the base-plate $a$, as shown in Fig. 1, and thus assists in supporting the guide A. Each arm B is provided at its end with a threaded aperture for receiving the guide pads or cushions $k\ k$, that are adjustably secured by nuts $j$, as shown.

The body of the saw-guide A is provided with a threaded opening, $l$, for receiving the shank of a saw jointer or rounder such as is described in my application of even date herewith.

The operation and advantages of my improved saw-guide will be apparent, and need not be further explained.

Having thus described my invention, what I claim as new, and desire to secure by Letters Patent, is—

The combination of the slotted base-plate $a$, having a lug or bearing, $a'$, and a sleeve, $c$, provided with set-screw $h$, the saw-guide A, having arms B B, lug $i$, and a longitudinally-grooved hollow shank, $d$, the threaded spindle $e$, for engaging said shank, said spindle being provided with a smooth reduced portion, $e'$, at its rear end, and the hand-wheel $f$, having a hub, $g'$, secured to said spindle by a pin or bolt, $g$, substantially as shown and described.

In testimony whereof I affix my signature in presence of two witnesses.

GEORGE S. BLACK.

Witnesses:
FRANK H. LEVERING,
D. V. BURNS.